Nov. 14, 1939.  R. THOMAS  2,180,217

LAGGING CLUTCH

Filed Sept. 20, 1938

RAY THOMAS,
INVENTOR.

BY James M. Abbett
ATTORNEY

Patented Nov. 14, 1939

2,180,217

UNITED STATES PATENT OFFICE 2,180,217

LAGGING CLUTCH

Ray Thomas, Los Angeles, Calif.

Application September 20, 1938, Serial No. 230,776

2 Claims. (Cl. 74—230.24)

This invention relates to power transmission means, and particularly pertains to a lagging clutch pulley, the present application being a continuation of my co-pending application entitled Lagging clutch pulley structure, filed by me on the 17th day of June 1935, and bearing Serial No. 26,907 now Patent No. 2,144,443.

Various types of machinery are driven by a prime mover provided to transmit power directly to a driving element, that element in turn transmitting power through a belt or the like to driven means. When such power transmission is effected without an intermediate variable speed transmission it will be recognized that a heavy load resists the starting torque of the prime mover and that undesirable strain or slippage will occur between the prime mover and the member being driven. This requires the use of a more powerful prime mover than would otherwise be necessary or some type of lagging transmission permitting initial acceleration of the prime mover. It is the principal object of this invention to provide automatic means embodied in a belt or chain pulley by which a prime mover will be permitted to have sufficient initial acceleration to reach a proper driving speed to carry the given load while a driving relationship is delayed and then is automatically and gradually set up between the prime mover and a member being driven.

The present invention contemplates the provision of a pulley structure which may be directly connected to the driven shaft of a prime mover and will support a driving belt in an idling position while the prime mover is accelerating to driving speed, the structure carrying means whereby the pulley and the belt will remain inactive until the prime mover has reached a predetermined driving speed after which they will gradually increase their frictional engagement with each other until a member driven by the belt attains its designed driving speed.

The invention is illustrated by way of example in the accompanying drawing in which.

Figure 3:
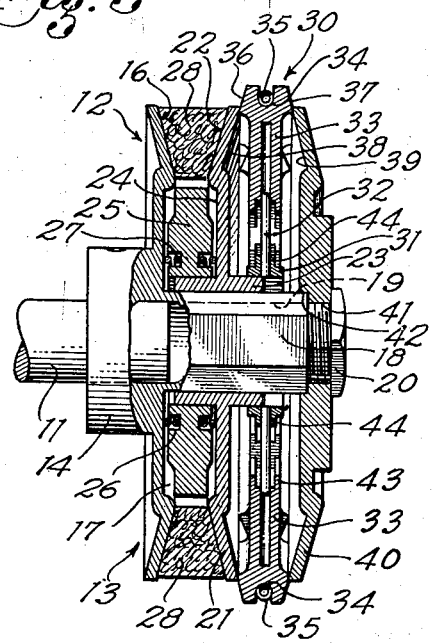
Fig. 3 is a view in central longitudinal section showing the parts of the clutch in their clutch position, and with certain parts disclosed in elevation.

Referring more particularly to the drawing, 10 indicates a prime mover, such as an electric motor or engine, having a drive shaft 11. This shaft receives a lagging clutch pulley 12 with which the present invention is concerned. The pulley includes a flange disc 13 formed with a hub 14 into which the drive shaft 11 extends and upon which it is fastened by a set screw 15. The marginal portion of this disc is formed with an inclined pulley face 16 disposed upon the opposite side of the disc from the prime mover. A central portion of the disc is formed with an annular recess 17 for a purpose to be hereinafter described. Extending from the disc 13 upon the opposite side of it from the hub 14 is a hub 18 shown in Figs. 3 and 4 as being hexagonal in shape, and through which a bore 19 occurs receiving the end of the drive shaft 11, and a threaded cap screw 20 by which the entire structure is held in an assembled position as will be hereinafter described. Slidably mounted upon the hub portion 18 is a pulley disc 21 which is complementary to the pulley disc 13 and has an inclined face 22 opposing the inclined face 16 of disc 13. A hub 23 occurs at the center of the disc 21 and extends at opposite sides of the center plane of the disc to hold the disc in lateral alignment. The center bore of the hub 23 is hexagonal so that the disc 21 with its hub may slide longitudinally on the hub 18 and be driven positively therewith. An annular recess 24 is formed in the disc 21 and opposes the recess 17 of the disc 13. Disposed between the pulley discs 13 and 21 is a belt supporting disc 25 which is preferably made of Bakelite, and is free to slide longitudinally of the hub 23. This disc has a circular bore through it agreeing with the cylindrical outer face of the hub 23. Formed in the side faces of the disc 25 are grooves 26 which receive springs 27 acting between the disc and the opposing faces of the pulley discs 13 and 21 to support the floating disc 25 in an intermediate position between the pulley discs 13 and 21 and to maintain the floating disc 25 in a substantially central position between the pulley discs 13 and 21 as the disc 21 moves toward and away from the disc 13 in a manner to be hereinafter set forth. The outermost portion of the floating disc 25 extends between the inclined faces 16 and 22 of the pulley discs 13 and 21 and thus will support a driving belt 28 which is preferably of the V-type when the discs 13 and 21 are not exerting sufficient clutch pressure to lift the belt from disc 25.

Figure 1:
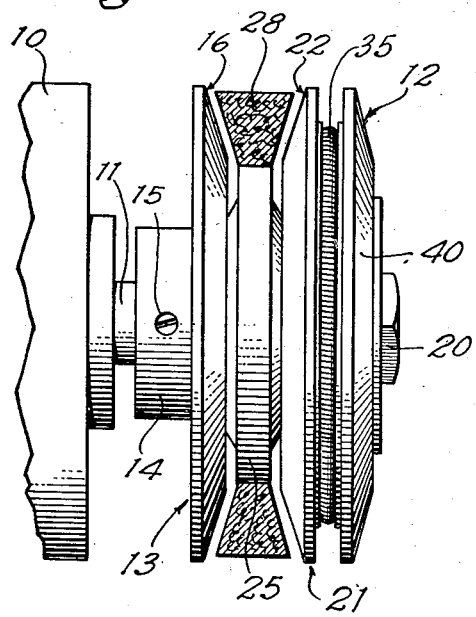
Figure 1 is a view in side elevation showing the lagging pulley and clutch with which the present invention is concerned.
Figure 2:
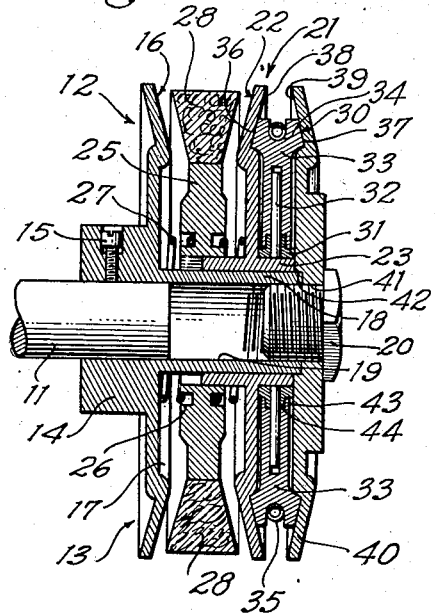
Fig. 2 is a view in central longitudinal section showing the relative position of the parts when the clutch is inoperative.
Figure 4:
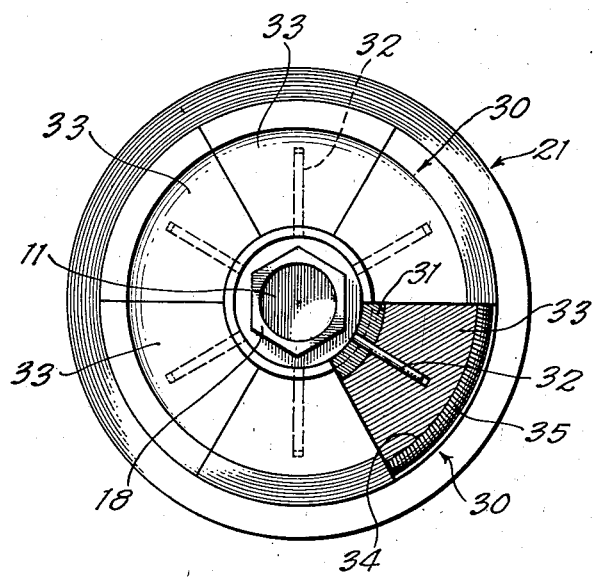
Fig. 4 is a view of the clutch element with the outer plate removed to disclose the segments thereof, and with one of the clutch segments shown in section to indicate the manner in which it is monted upon the clutch ring.

Mounted upon the outermost end of the hub 23 of the disc 21 is a centrifugal clutch unit 30. This unit includes a center ring 31 carrying pins 32. The pins are spaced equidistant around the ring and extend radially and outwardly therefrom. Mounted on each pin is a clutch segment 33. In Fig. 4 of the drawing six of these segments are shown and when disposed in their innermost position form a composite circular disc. The clutch segments are each formed with a groove 34 in their outer marginal edge and within this groove an annular coil spring 35 is seated. The coil spring embraces the entire set of segments and yieldably holds the segments in their innermost position.

The outer portion of the segments are widened and provide opposite inclined faces 36 and 37, one of which rests against the inclined face 38 formed on the outside of the pulley disc 21, while the other rests against an oppositely inclined face 39 formed on the inner side of a clutch disc 40. The inclined faces 38 and 39 converge toward the margin of the discs 21 and 40 and are thus disposed at opposite angles to the inclined faces 16 and 22 of the pulley discs 13 and 21. The clutch disc 40 is formed with a central circular bore 41 through which the cap screw 20 extends. The inner face of the clutch disc 40 is formed with a hexagonal counterbore 42 into which the outer end of the hub 18 of the pulley disc 13 extends and terminates. It will thus be seen that the cap screw 20 holds the entire structure in assembled condition. Attention is also directed to the fact that overhanging slips 43 on the inner marginal edges of the clutch segments 33 engage opposite sides of a central extension 44 of the clutch ring 31 and hold the clutch segments in alignment to prevent them from having lateral movement while being free to move radially of the rotating axis of this structure.

Attention is directed to the fact that the ring 31 of the centrifugal clutch unit is of slightly greater width than the thickness of the segments 33 so that the spring 27 will exert a pressure against the ring 31 and between the faces of clutch discs 21 and 40. This is the only initial rotational driving force occurring between the clutch unit 30 and the entire structure since the hub 23 of the disc 21 is cylindrical and the bore through the ring 31 is circular.

In operation of the present invention the pulley structure as assembled is mounted upon a drive shaft 11. In normal position the driving belt 28 runs idle supported upon the floating disc 25. The disc 25 will run idle upon the inner end of the hub 23 which forms a part of the pulley disc 21. The hub 23 will at the same time be driven by the hub 18 on which it is mounted and since the hub 18 is hexagonal in outer configuration to conform to the hexagonal bore within the hub 23 the pulley disc 21 will be positively driven.

Mounted upon the hub 23 is the clutch assembly and as the disc 21 rotates the clutch assembly will rotate with it. The outer tapered faces 36 and 37 of the clutch segments 33 will frictionally engage the complementary faces 38 and 39 of the pulley disc 21 and the clutch disc 40.

The ring 31 will be held between the faces of discs 21 and 40 and will remain substantially motionless until the speed of rotation of the discs 21 has created sufficient friction to cause the ring 31 and the centrifugal clutch unit 30 to begin rotation. This preliminary period will prevent the power driving unit to attain a desired acceleration of speed. The clutch unit will then be gradually and frictionally driven.

As the centrifugal force set up by the rotation of the entire structure increases the segments 33 will force themselves radially of the rotating axis and their inclined faces will force against the inclined faces 38 and 39 of the pulley 21 and the clutch disc 40 respectively. This action will be resisted by the tension of the coil spring 35 which circumscribes the assembled set of discs. This outward movement of the segments will cause the disc 31 to move longitudinally of the hub 18 to close the gap between the faces 16 and 22 of the pulley discs 13 and 31 respectively. This action is yieldably resisted by the springs 27 which are interposed between the opposite faces of the floating disc 25 and adjacent the faces of the pulley discs 13 and 21. As the disc 21 moves toward the disc 13 the driving belt 28 will be frictionally gripped along its opposite tapered sides by the adjacent tapered faces 16 and 22 of the pulley discs 13 and 21 and will be lifted from the disc 25. This gripping action will continue until slippage has been overcome, at which time the driving belt 28 will move in direct relation to the rotational movement of the shaft 11 and the pulley discs. In the event driving operation of the shaft 11 is discontinued it is evident that the coil springs 27 may force the pulley disc 21 away from the pulley disc 13 and toward the clutch disc 40. Thus it will be seen that in either the event of starting the driving operation, or when the driving operation is discontinued, the clutch will act automatically to produce a variable driving action between the pulley structure and the driving belt.

It will be recognized also that by varying the strength of the spring 27 a desired initial period of acceleration of the power driving unit may be established. This allows the prime mover to attain a desired speed before a load is imposed upon it. After that speed has been reached the clutch action gradually increases until the driving and driven members are operating in unison, thus a much smaller prime mover is required than would be the case if the entire load had been initially applied.

It will thus be seen that the structure here disclosed is quite simple and compact in design, and that its parts will not be subject to extreme wear in producing the automatic clutch operation.

While I have shown the preferred form of my invention, as now known to me, it will be understood that various changes might be made in the combination, construction and arrangement of parts, by those skilled in the art, without departing from the spirit of the invention as claimed.

Having thus described my invention, what I claim and desire to secure by Letters Patent is:

1. In combination with a drive shaft, a pair of pulley elements carried thereby, one of said elements being fixed with relation to the shaft and the other of said elements having a slidable driving connection with the shaft, a floating disc between said pulley elements and around which a drive belt is led, said floating disc being freely rotatable with relation to the pulley elements and the shaft, yieldable means disposing the disc between the pulley elements and acting to normally hold the pulley elements in their outermost position of separation, and permitting the movable pulley element to move toward the fixed pulley element to grip the belt, an annular inclined face formed on the outer side of the movable pulley element, a plurality of clutch segments mounted to move against the inclined face of said movable pulley element and shift the same toward the fixed pulley element as influenced by centrifugal action of the rotating structure, and a fixed clutch disc against which the clutch segments act in shifting the movable pulley element.

2. In combination with a drive shaft, a pair of pulley elements carried thereby, one of said elements being fixed with relation to the shaft and the other of said elements having a slidable driving connection with the shaft, a floating disc between said pulley elements and around which a drive belt is led, said floating disc being freely rotatable with relation to the pulley elements and the shaft, yieldable means disposing the disc between the pulley elements and acting to normally hold the pulley elements in their outermost position of separation, and permitting the movable pulley element to move toward the fixed pulley element to grip the belt, an annular inclined face formed on the outer side of the movable pulley element, a plurality of clutch segments mounted to move against the inclined face of said movable pulley element and shift the same toward the fixed pulley element as influenced by centrifugal action of the rotating structure, a fixed clutch disc against which the clutch segments act in shifting the movable pulley element, and means acting to retract the clutch segments as centrifugal action in the rotating structure decreases whereby the movable pulley element may return to its original non-gripping position.

RAY THOMAS.